United States Patent
Farwig et al.

(10) Patent No.: US 6,718,725 B2
(45) Date of Patent: Apr. 13, 2004

(54) APPARATUS FOR FOLDING AND PACKAGING AN AIRBAG AND METHOD THEREOF

(75) Inventors: Imre Farwig, Biesenthal (DE); Tobias Pausch, Berlin (DE); Alexander Zeller, Berlin (DE); Hubertus Krause, Zühlsdorf (DE)

(73) Assignee: Takata-Petri AG, Aschaffenburg (DE)

( * ) Notice: Subject to any disclaimer, the term of this patent is extended or adjusted under 35 U.S.C. 154(b) by 79 days.

(21) Appl. No.: 09/917,855

(22) Filed: Jul. 31, 2001

(65) Prior Publication Data

US 2002/0020148 A1 Feb. 21, 2002

(30) Foreign Application Priority Data

Aug. 7, 2000 (DE) .......................................... 100 39 554

(51) Int. Cl.$^7$ .............................................. B65B 63/04
(52) U.S. Cl. ............................. 53/116; 53/523; 53/529; 493/440; 493/456
(58) Field of Search ...................... 53/429, 436, 116, 53/121, 523, 529; 493/440, 451, 456, 463, 464

(56) References Cited

U.S. PATENT DOCUMENTS

| | | | | |
|---|---|---|---|---|
| RE12,204 E | * | 3/1904 | Casterline | 270/40 |
| 3,831,501 A | * | 8/1974 | Bevington, Jr. | 493/440 |
| 4,089,514 A | * | 5/1978 | Skipworth | 493/440 |
| 4,236,704 A | * | 12/1980 | Bell | 493/440 |
| 4,252,591 A | * | 2/1981 | Rosenberg | 493/440 |
| 4,298,148 A | * | 11/1981 | Gakiya | 493/440 |
| 4,560,434 A | * | 12/1985 | Sato | 156/474 |
| 5,375,393 A | | 12/1994 | Baker et al. | 53/429 |
| 5,554,095 A | * | 9/1996 | Matsuo | 493/440 |
| 5,669,204 A | | 9/1997 | Blaisdell | 53/429 |
| 5,938,580 A | * | 8/1999 | Siekmann | 493/464 |
| 6,115,998 A | | 9/2000 | Reh et al. | 53/429 |
| 6,238,328 B1 | * | 5/2001 | Loppnow et al. | 493/440 |
| 6,248,052 B1 | * | 6/2001 | Kleeberger et al. | 53/116 |

FOREIGN PATENT DOCUMENTS

| | | |
|---|---|---|
| DE | 195 35 564 | 3/1997 |
| DE | 197 54 078 | 6/1998 |
| DE | 197 51 685 | 5/1999 |
| DE | 198 45 721 | 4/2000 |
| JP | 6-48261 | 2/1994 |
| JP | 6-87392 | 3/1994 |
| WO | WO 99/20492 | 4/1999 |

* cited by examiner

*Primary Examiner*—John Sipos
*Assistant Examiner*—Louis Huynh
(74) *Attorney, Agent, or Firm*—Foley & Lardner

(57) ABSTRACT

An apparatus and method for folding and packaging an airbag includes a tapered concentrator. The airbag can be a head or side-window airbag. The concentrator has an inlet and an outlet whose dimension is smaller than the inlet. Feeding the airbag through the concentrator squeezes or compresses (i.e., folds) the airbag to a predetermined cross section corresponding the outlet size of the concentrator. The airbag can include a strap at one end portion thereof. The strap is feed through the concentrator, such as by pulling the strap therethrough. Pulling the strap pulls the airbag through the smaller outlet, which compresses or folds the airbag. Also, by placing an airbag package having an inlet sized to the outlet of the concentrator adjacent to the outlet of the concentrator, and feeding the strap through the airbag package, the folded airbag is inserted into the package substantially simultaneously with the folding operation. The concentrator can include pre-orienting elements for forming uniform folds.

25 Claims, 5 Drawing Sheets

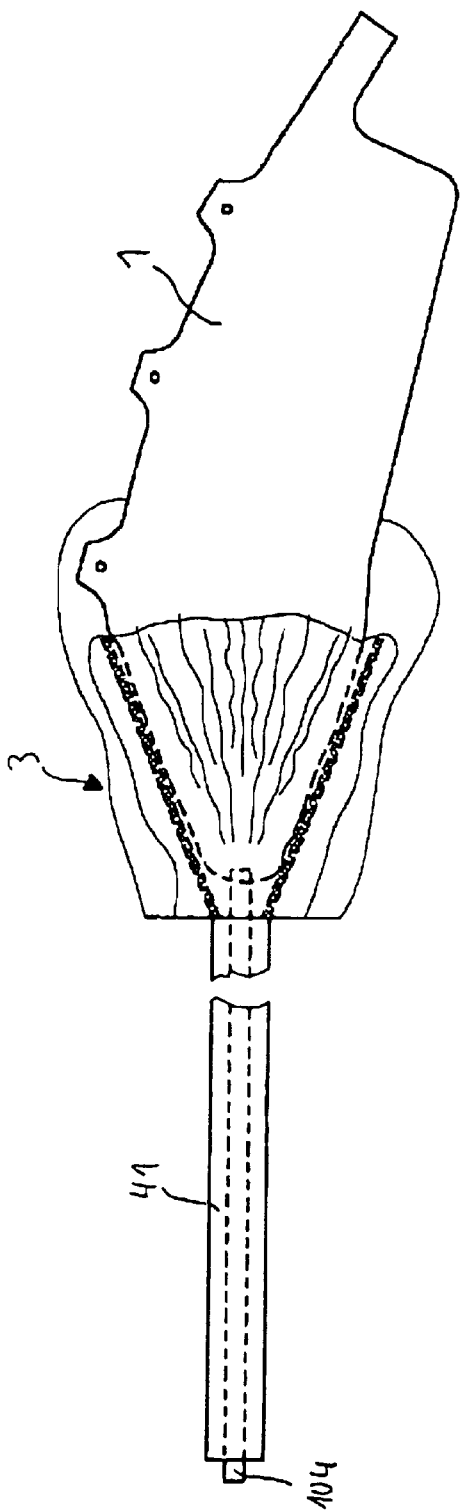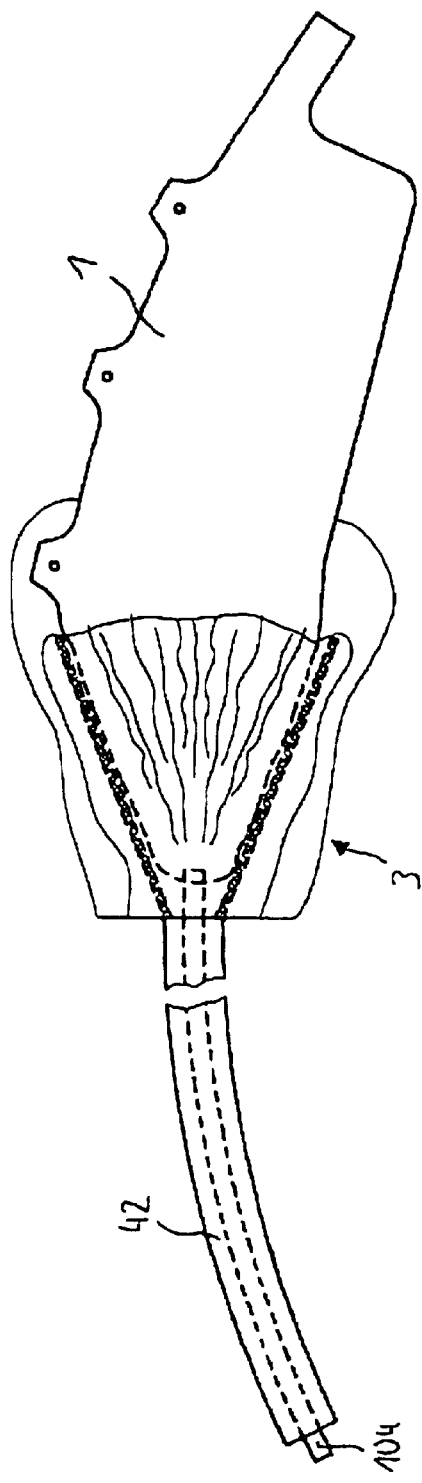

APPARATUS FOR FOLDING AND PACKAGING AN AIRBAG AND METHOD THEREOF

BACKGROUND

German patent publication DE-197 54 078 discloses an airbag folding apparatus for producing airbag folds having a concertina-shaped profile. Here, the airbag conveys through a series of folding stations, each of which has moveable pairs of disks for folding the airbag. After the airbags leave the last folding station, the folds thus made are brought to bear against one another. A large number of machine elements makes the airbag folding process complicated and expensive.

Another German patent publication DE-195 35 564 discloses an airbag folding apparatus for folding an airbag by gathering the airbag toward a center using one or more slides. It can also include additional mechanical shaping elements for producing uniform folds. The entire airbag must rest on a flat surface, such as a base plate, and requires a cover plate, along with at least one slide and an associated drive mechanism.

In addition, for packaging a head airbag or side-window airbag, it is known to fold the airbag having a desired dimension (for example with the apparatuses described above) and then pull it into a flexible hose, or alternatively to fold it directly into a fixed housing. Here, the airbag likewise is folded using slides or knife folders. Accordingly, such an apparatus likewise is relatively costly.

In this respect, German patent publication DE 198 45 721 A1 describes a simpler apparatus for folding an airbag to a predetermined dimension. Here, the apparatus has a funnel-shaped member for squeezing or concentrating the airbag in the extended state. Once the funnel-shaped member compresses the airbag to a predetermined lateral dimension, the airbag is further compressed axially with a slide. The compressed airbag is then pushed out forcibly into a receptacle housing using the same slide. This apparatus requires a slide for axially pushing together the airbag and expelling it into a receptacle apparatus, and thus is relatively costly. The use of a slide also limits the speed of the folding of the airbag.

There still remains a need for improving the airbag folding apparatus and method without the disadvantages of these known airbag folding apparatuses. The present invention addresses this need.

SUMMARY OF THE INVENTION

The present invention relates to an apparatus for folding and packaging an airbag, and a method thereof.

One aspect of the present invention is an airbag folding apparatus includes a concentrator having an inlet and an outlet. The outlet has a smaller cross section so that the concentrator squeezes or compresses, i.e., folds, the airbag passing through the concentrator to a predetermined cross section. The concentrator is configured to reduce the dimension of the airbag by moving at least one of the airbag and concentrator relative to the other so that the airbag passes completely through the outlet. An area between the inlet and the outlet defines an airbag folding or compressing region or zone.

The inlet has a first cross section and the outlet has a second cross section that is smaller than the first cross section. The folded or compressed airbag thus exiting the outlet has a cross section substantially corresponding to the second cross section. The concentrator can be tapered at least along one plane so that the second cross section is smaller than the first cross section.

The concentrator can comprise a base plate and first and second concentrating elements mounted, spaced apart, on the base plate. The first concentrating element has a first cross section and the second concentrating element has a second cross section that is smaller than the first cross section. The concentrator can include at least one additional intermediary concentrating element secured to the base within the compressing region, between the first and second concentrating elements. The cross section of the additional concentrating element corresponds to the tapering profile of the concentrator. At least the first and second concentrating elements can have openings with a same height. The concentrating elements each can be U-shaped and secured to the base plate in an inverted configuration so that the base plate covers an open-end side of the U-shaped concentrating elements.

In another embodiment, the concentrator can comprise a base plate, a pair of concentrating elements mounted on the base plate, and a cover plate positioned over the concentrating elements so that the base and cover plates sandwich the concentrating elements. The height of the concentrating elements can define the height between the base and cover plates. The concentrating elements can comprise a pair of opposing side walls tapering toward the outlet.

At least the inlet and outlet can include pre-orientating elements for forming substantially uniform folds substantially along a longitudinal direction. In this respect, at least the first and second concentrating elements include pre-orienting elements for forming substantially uniform folds substantially along a longitudinal direction. In the alternative embodiment, at least the cover plate can include the pre-orienting elements for forming substantially uniform folds substantially along a longitudinal direction. The base plate also can include pre-orienting elements, which can be staggered relative to the pre-orienting elements of the first and second concentrating elements or the cover plate. The pre-orienting elements can comprise vertical webs or pins connected alternately to the base plate and the cover plate. In an alternative embodiment, the pre-orientating elements of the base plate or the pre-orienting elements of the cover plate or both can be retracted out of the compressing region.

These pre-orientating elements can form concertina-shaped folds substantially along the longitudinal direction.

Another aspect of the present invention is an airbag packaging apparatus, which can have all of the features of the above described airbag folding apparatus. The folding apparatus can be used for packaging the folded airbag into an airbag package. The folded airbag can be pulled into an airbag package as the folded airbag exits the outlet of the concentrator. The airbag package can be attached to the concentrator or held adjacent to it using any conventional means during that process.

The airbag package can have an inlet that has a cross section substantially corresponding to the outlet of the concentrator. The package can be elongate for side-window or head airbag. The length of the airbag package can correspond substantially to an extent of the airbag in the longitudinal direction. The package can further include lateral openings. The airbag can have a plurality of attachment tabs that align with the lateral openings when the airbag is fully inserted into the airbag package. The attachment tabs can be pulled through the lateral openings to expose them.

Another aspect of the invention is a method of folding an airbag, which can use the folding apparatus described above. In this respect, the method includes providing the concentrator and moving at least one of the airbag and concentrator relative to the other so that the airbag passes through the outlet to fold or compress the airbag to a predetermined cross section.

Another aspect of the invention is a method of packaging an airbag, which is substantially similar to the folding method described above. The package method includes additional steps of providing the afore-described airbag package and placing the inlet of the package adjacent to the outlet of the concentrator and moving at least one of the airbag and concentrator with the airbag package relative to the other so that the folded airbag exiting the concentrator is inserted into the airbag package.

The airbag can include a strap or the like at one end portion thereof. Pulling the strap through the concentrator and the airbag package while maintaining the concentrator at a fixed position pulls the airbag out of the concentrator and into the airbag package. Alternatively, the strap can be fixed to a stationary element. Moving the concentrator and the airbag package relative to the airbag so that strap becomes exposed through the airbag package also pulls the airbag out of the concentrator and into the airbag package.

The method can further include the step of pulling out the attachment tabs through the lateral openings after the airbag has been inserted into the airbag package.

Pulling the airbag through the concentrator having the pre-orienting elements substantially forms uniform folds.

BRIEF DESCRIPTION OF THE INVENTION

FIG. 4 shows the folding/packaging apparatus of FIG. 3 with a flexible package positioned next thereto for receiving the folded airbag.

FIG. 5 is similar to FIG. 4, but with a rigid package.

DETAILED DESCRIPTION

Figure 1:
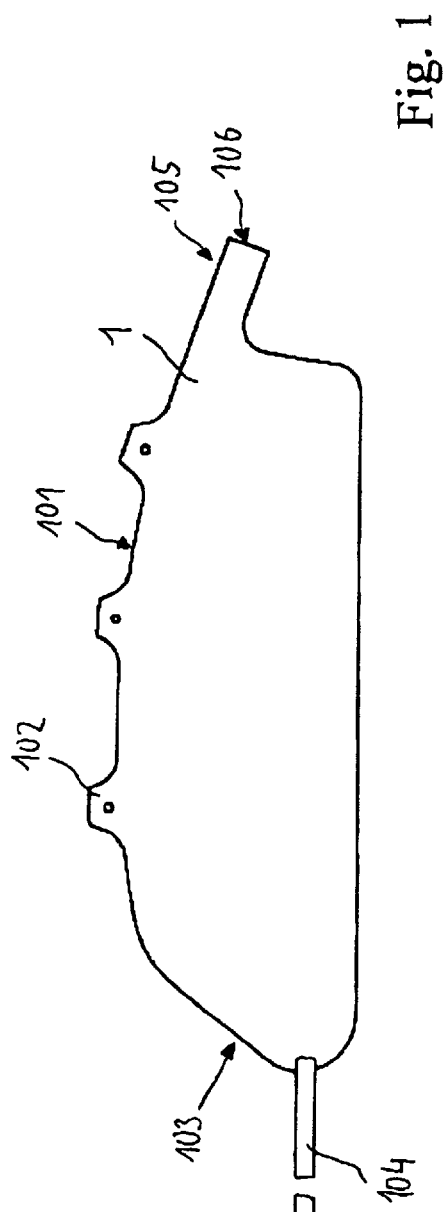
FIG. 1 shows a schematic view of an airbag of a side impact protection apparatus in an extended state.

FIG. 1 shows an airbag 1, which can be conventional 1 for a lateral impact protection, in an extended flat state. In the inflated state, such an airbag can extend from a region to the side of a front seat passenger as far as a region to the side of a rear seat passenger. This can prevent the head or other limbs of a vehicle occupant from impacting against a side window or vehicle pillar of the vehicle. Moreover, this also prevents, during a side collision involving the vehicle rolling or a subsequent collision, the head or other limbs from hanging out of the vehicle.

In such an airbag 1, its upper edge 101 is typically configured to the profile of the roof edge of the vehicle to which the airbag is to be installed and has attachment tabs 102. The attachment tabs 102 permit the airbag 1 to be attached in a point-attachment fashion to the roof edge or to the roof frame of the vehicle. A strap 104 is attached to one end portion 103 of the airbag 1, which portion is referred to as a front or leading end 103. When the side impact protection apparatus is actuated, the strap 104, which is secured to the vehicle, exerts a tensile force on the airbag 1 to provide continuous protection against the head or other limbs of the vehicle occupant. At the opposite end 105 of the airbag 1, which is referred to as a rear or trailing end 105, the airbag 1 has a gas inlet opening 106, through which gas flows into the airbag 1 when an associated gas generator (not illustrated) is actuated.

According to the present invention, the airbag of the type illustrated in FIG. 1 for a side impact protection can be folded and packaged (or stored) in an elongated airbag package or housing 4 (41, 42), which can comprise a flexible cover 41, such as a fabric hose, or a rigid housing 42. The package 4 can be configured to attach at least partially to the roof frame of a vehicle. The present invention relates to an apparatus and a method for folding the airbag of the type illustrated in FIG. 1 and inserting into an airbag package 4.

Figure 2:
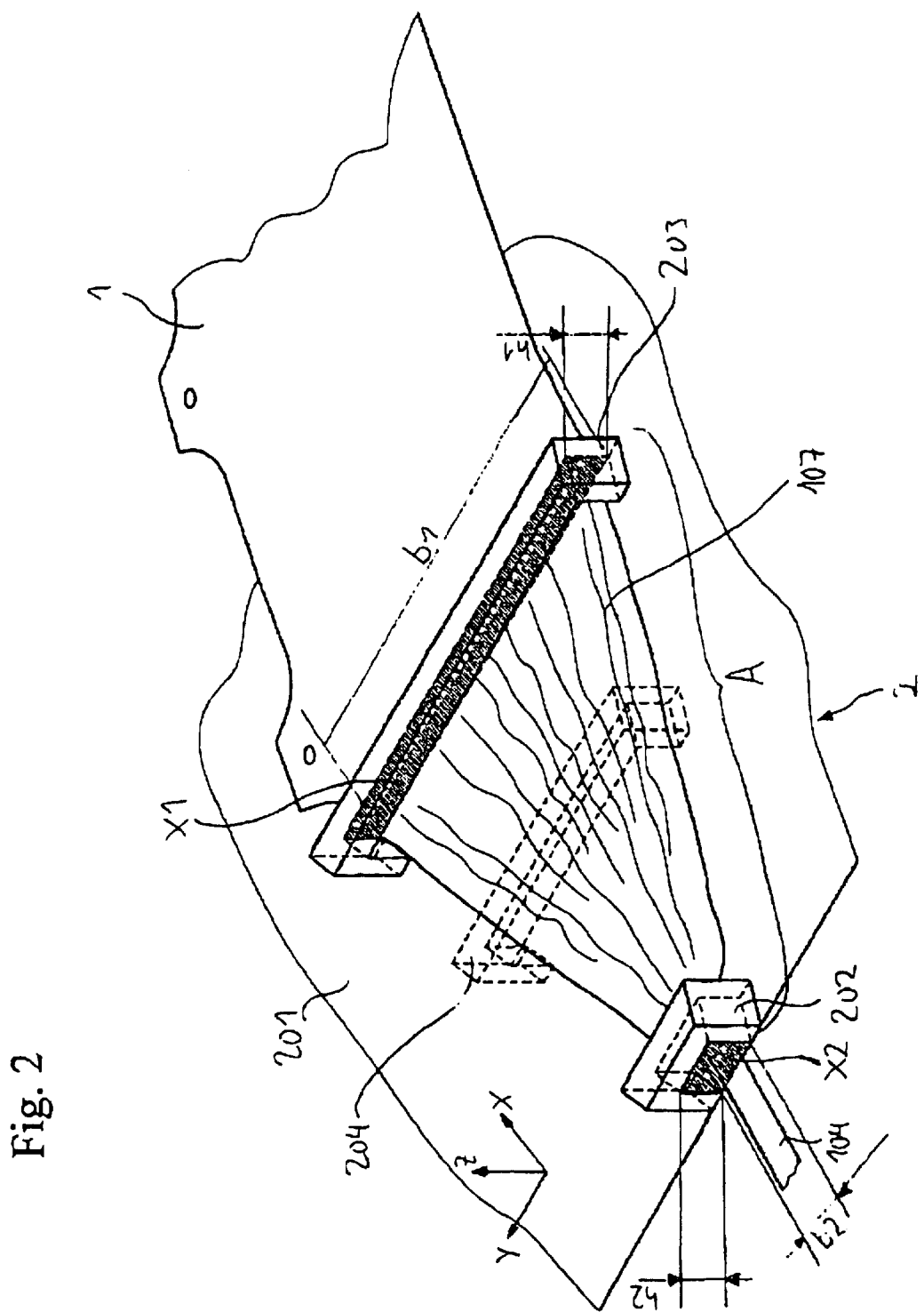
FIG. 2 shows a first embodiment of a folding/packaging apparatus according to the present invention for folding and packaging the airbag of the type shown in FIG. 1.

FIG. 2 illustrates one embodiment of a folding/packaging apparatus 2 according to the present invention. Here, the apparatus 2 has a base plate 201 and at least two aligned concentrating elements 202, 203, which can be shaped apart in the longitudinal direction. Each concentrating elements 202, 203 can be substantially U-shaped and can be permanently connected to the base plate 201 in an inverted position. The two concentrating elements 202, 203, together with the base plate 201, form two concentrators having substantially rectangular frames that define a first throat or inlet X1, and a second throat or outlet X2 that is smaller than the inlet. A folding or compressing region or zone A is formed between the two throats X1, X2.

The cross section of the inlet X1 is defined by the width b1 of the inlet opening in the y direction, and the height h1 of the inlet opening in the z direction. The cross section of the outlet X2 can be defined by the width b2 of the outlet opening in the y direction and the height h2 in the z direction. The width b1 of the inlet X1 can correspond substantially to the extent of the airbag 1 in the y direction so that the airbag 1 can be easily pulled through the inlet X1. The size of the outlet X2 corresponds substantially to the cross-section of the airbag package 4 into which the airbag 1 is pulled into during the folding process.

Although two concentrating elements 202, 203 are illustrated, the present invention can include at least one additional concentrating elements 204 (shown in phantom) positioned in the folding region A, between the two concentrating elements 202, 203, with appropriate intermediate dimension.

To fold the airbag 1, the airbag 1 is spread out, i.e., laid flat, on the base plate 201. The base plate 201, however, can be merely sized to accommodate the folding region A. Since the airbag needs to be supported only on the base plate in the folding region between the first and second concentrating elements 202, 203, the folding apparatus only requires a small amount of space. There is no need, as in the prior art, for the base plate to extend over the entire surface of the extended airbag. After the airbag 1 is spread out on the base plate 201, the clamping strap 104 is inserted through the concentrating elements 203, 202 and lead out of the concentrator, i.e., adjacent to the outlet X2.

In addition, the strap 104 is inserted through the package 4 adjoining the second concentrating element 202. The package 4 can be secured to the concentrating element 202 during the folding process. Then, the strap 104 can be pulled, such as using an appropriate pulling apparatus or manually, until it exits the concentrator. The airbag 1 is placed continuously in folds 107 from the region adjoining the clamping strap 104.

Pulling the strap 104 through the funnel-shaped concentrating elements 202, 203 and the package 4, folds, squeezes, or compresses the airbag 1 to the packaging dimension and feeds the folded airbag into the package 4. The folded airbag 1 has a height that is substantially the same as the height h2 of the outlet cross section of the outlet X2. If the airbag 1 is not pulled into a package 4 after it leaves the folding apparatus 2, but instead pulled through spaced correspondingly sized ring-like elements for example, the airbag 1 can be maintained in a folded state after it leaves the folding apparatus 2. Thereafter, the folded airbag 1 can be separately inserted into the package 4 or stored separately in that state.

In the folding/packaging apparatus 2 of FIG. 2, the first height h1 of the inlet X1 can be equal to the height of the second h2 of the outlet X2. Alternatively, the first height h1 can also be larger than the second height h2. In that case, the folding region A tapers (narrows) to the outlet X2 in both directions, horizontally and vertically.

Figure 3:
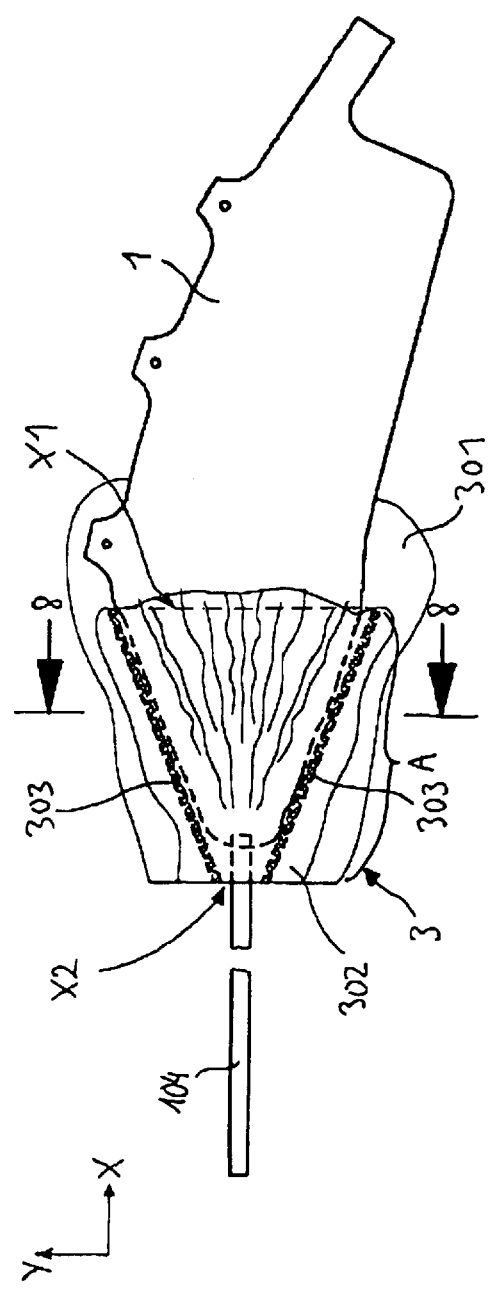
FIG. 3 shows a second embodiment of a folding/packaging apparatus according to the present invention for folding and packaging the airbag of the type shown in FIG. 1.

FIG. 3 shows another embodiment of a folding/packaging apparatus 3. FIGS. 4 and 5 disclose the apparatus of FIG. 3 with different types of airbag packages 4. In the embodiment of FIG. 3, the folding/packaging apparatus 3 has a base plate 301, a cover plate 302, and concentrating elements 303, which can be side walls having a tapering angles, i.e., funnel-shaped configuration. The base and cover plates can be parallel to each other or tapered. The side walls 303, together with the base and cover plates 301, 302 form a continuous concentrator. The two side walls 303 extend toward each other to define a first throat or inlet X1, and a second throat or outlet X2.

The side walls 303 can be permanently attached to the base plate 301. The cover plate 302 is movable so that it is positioned immediately above the side walls 303 after inserting the clamping strap 104 and the leading end portion 103 of the airbag 1. The folding or compressing region or zone A is also formed between the inlet and outlets X1, X2. The cross section of the folding region A tapers (narrows) continuously in the direction of the outlet X2 as the side walls 303 taper toward the outlet X2. The height of the side walls 303 defines the desired folding height of the airbag 1 to be folded. The height of the side walls 303 defines the orientation of the base and cover plates 301, 302. If the height of the opposing side walls 303 is tapering toward the outlet X2, i.e., height greater at the inlet X1, then the base and cover plates 301, 302 taper toward the outlet X2, much the same way the side walls 303 taper toward the outlet X2.

Figure 6:
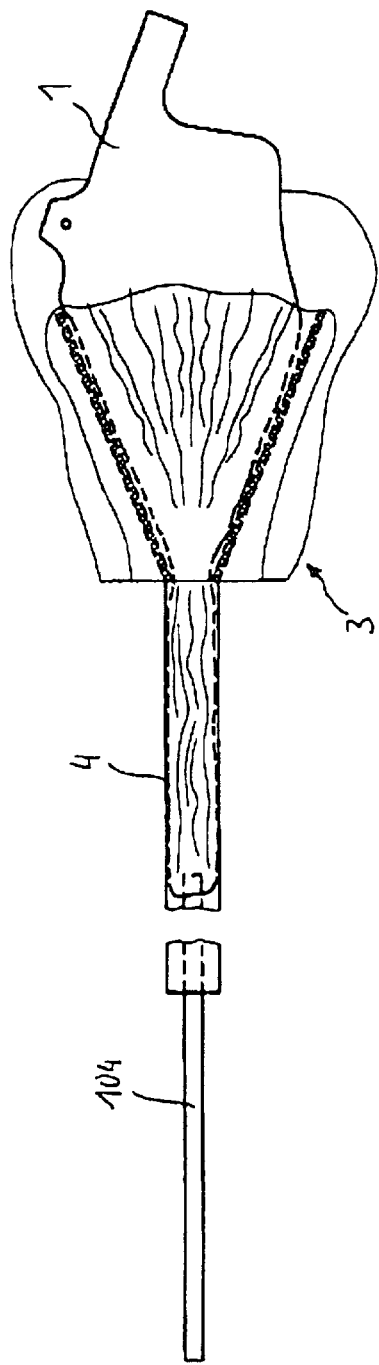
FIG. 6 shows the folding/packaging apparatus and the flexible package of FIG. 4, with the airbag partially inserted in the package.

Referring to FIG. 6, pulling the clamping strap 104 through the concentrator folds, squeezes, or compresses the airbag 1, as previously described with reference to the embodiment of FIG. 2. That is, pulling the airbag 1 through a concentrator compresses the airbag to the desired packaging dimensions, which decreases toward the pulling direction in the folding region A of the folding apparatus 3. Also, the folded airbag 1 can be packaged by pulling the folded airbag coming out of the outlet X2 into the package 4, as shown in FIG. 6. The airbag 1 thus is thus substantially simultaneously packaged in the adjoining package 4 during the folding process.

The only difference between the exemplary embodiments of FIGS. 2 and 3 is that the folding region is completely closed at the sides and at the top in the embodiment of FIG. 3.

It should be noted that the airbag 1 does not need a strap 104 in either of the exemplary embodiments of FIGS. 2 and 3. If the airbag 1 does not have a strap 104, a strap can be temporarily attached to the airbag 1 and removed after the airbag has been folded and packaged.

FIGS. 4 and 5 illustrate different embodiments of packages 41, 42, which can be used with the apparatuses of FIGS. 2 and 3. The cross section of the inlet opening of the package 41, 42 corresponds substantially to the outlet X2 of the apparatuses 2, 3. The package 4 can be a flexible cover or slip 41, as shown in FIG. 4, or a rigid housing 42, as shown in FIG. 5. The flexible cover 41 can be a fabric hose for instance. The flexible cover is advantageous in that the cover can be adapted to the profile of the storage along the roof edge of the vehicle during mounting. The shape of the rigid housing 42, on the other hand, has to be pre-configured to the profile of the storage along the roof edge of the vehicle.

Figure 7:
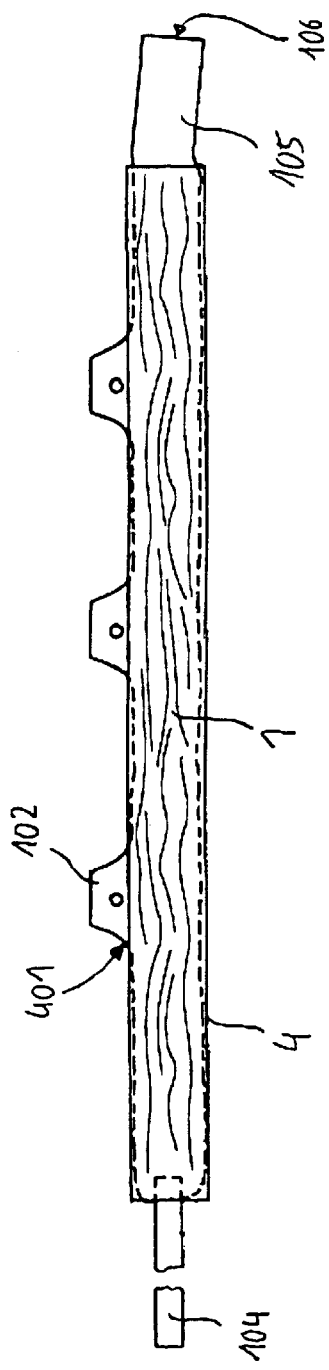
FIG. 7 is similar to FIG. 6, but with the airbag completely inserted in the package.

FIG. 7 shows the folded airbag 1 arranged completely in a package 4. Only the clamping strap 104 and the rear end 105 of the airbag 1 with the gas inlet opening 106 now project laterally out of the package 4. The package 4 further includes lateral openings 401 through which the attachment tabs 102 can be pulled out and exposed. When the airbag 1 is completely stowed in the package 4, its attachment tabs 102 substantially align with the lateral openings 401. The tabs 102 thus can be pulled through the openings 401 and attached to the roof edge. The package 4 is typically configured to break or tear when the airbag 1 inflates. In this respect, the package 4 can have one or more tear lines or weak points.

Figure 8:
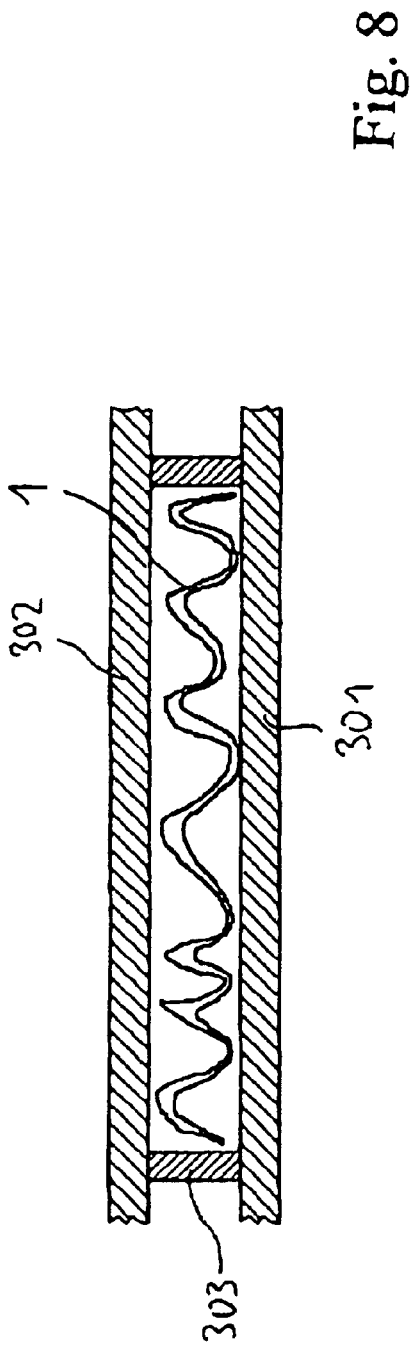
FIG. 8 shows a sectional view of the folding/packaging apparatus taken along line 8—8 of FIG. 3.
Figure 9:
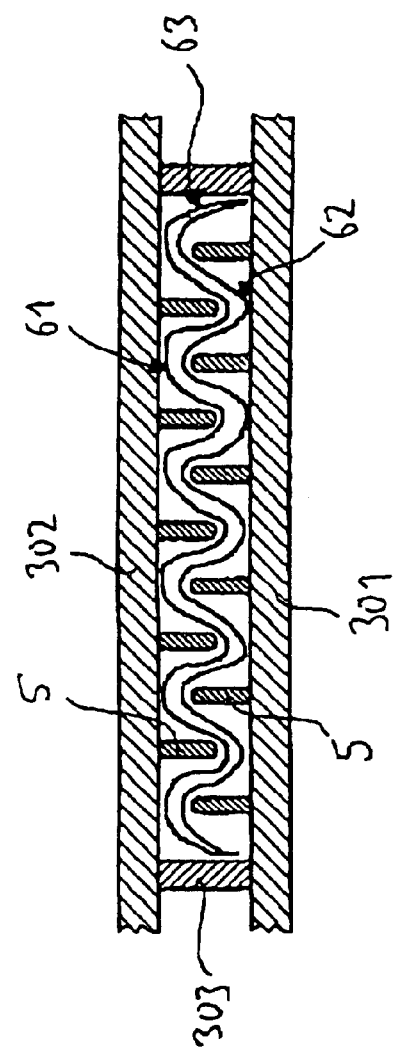
FIG. 9 shows a cross-sectional view of an apparatus for pre-orienting the airbag folds, and the associated fold profile of the airbag.

FIG. 8 shows a cross-sectional view taken along line 8—8 of FIG. 3, and illustrates the fold profile of the airbag 1 as it passes through the tapered folding region having parallel base and cover plates 301, 302. The folds of the airbag 1 extend substantially axially, but with relatively unordered folds, i.e., chaotic folds. If ordered, uniform folds are desired, as illustrated in FIG. 9, at least one of the base and cover plates 301, 302 can include pre-orienting elements 5. In the illustrated embodiment, each of the base and cover plates 301, 302 has uniformly spaced pre-orienting elements 5 extending along the pulling direction in the folding region A. The orienting elements 5 of the base and cover plates can be staggered as illustrated in FIG. 9. Moreover, the orienting elements 5 can extend along the entire folding region A or only a portion thereof. The orienting elements 5 taper similarly with the side walls 303, i.e., taper toward the outlet X2. The pre-orientation elements 5 thus create regular and ordered folds having upper fold edges 61 and lower fold edges 62, which alternate with the upper fold edges 61, that extend substantially axially. The height of the folded surfaces 63 is determined by the distance between the base and cover plates 301, 302.

In an alternative embodiment, the pre-orienting elements 5 can be movably mounted so that they can extend through slots (not illustrated) in the base and cover plates 301, 302, and be retracted.

In the exemplary embodiment of FIG. 2, similar pre-orienting elements can be positioned on the concentrating elements 202, 203, either fixed thereto or retractably mounted to them. The pre-orienting elements can be pins or small blades.

According to the present invention, the strap 104 can be clamped to a fixed element while the concentrator 2, 3 and the package 4, which is secured to the outlet X2 using any conventional means, are moved relative to the airbag 1, or both moved in the opposite directions.

The method according to the present invention thus involves drawing an airbag through a concentrator, either moving the concentrator relative to the airbag or moving the airbag relative to the concentrator, or moving both in the opposite directions. Pulling the airbag across the concentrator squeeze or compresses the airbag to a predetermined cross-section that can be inserted into a package positioned adjacent to the concentrator. The airbag is thus automatically folded as it passes through the concentrator, without requiring slides, knife folders or other moving parts. This results in a simple and cost-effective apparatus. The airbag can be folded quickly because the folding speed is solely dependent upon the speed at which the airbag is drawn relative to the concentrator. The folding speed is not limited by any slides and other moving parts.

It is to be understood that "folding," "squeezing", or "compressing" as used here generically means reducing the dimension of an airbag. Accordingly, folding, squeezing, and compressing are used interchangeably here. In any event, the folds resulting from folding, squeezing, or compressing the airbag need not be uniform. An "extended airbag" simply means a non-folded airbag, i.e., an airbag spread out in a planar fashion or filled with air or gas. A relative movement of the airbag with respect to the concentrator includes the arrangement where the airbag moves relative to a fixed concentrator, where the concentrator moves relative to a fixed airbag, and where both the airbag and the fixed concentrator move in the opposite direction. In any event, in all of these arrangements, the airbag is in a completely, folded state after leaving the concentrator. As a result, no further step is necessary to reduce the airbag to the size necessary for stowing it.

The present invention permits the airbag to be folded and packaged quickly and simply in one simple operation, and is suitable for all airbags in which the extent of the airbag in the longitudinal direction corresponds essentially to the length of the package, such as a side impact protection apparatus for a vehicle, e.g., head airbags or window airbags.

The concentrator can be funnel-shaped or even conical configuration. Thus, the concentrator can taper along one plane, such as an xy, yz, or zx plane, or along two planes xy, yz; xy, zx; or yz, zx, or circumferentially in the case of a conical configuration.

The disclosure of the priority application, DE 100 39 554.6 filed Aug. 8, 2000, in its entirety, including the drawings, claims, and the specification thereof, is incorporated herein by reference.

We claim:

1. An airbag packaging system comprising:
    a concentrator having an inlet and an outlet;
    wherein the outlet has a smaller cross section than the inlet so that the concentrator compresses an airbag passing through the concentrator to a predetermined cross section,
    wherein the concentrator is configured to fold the airbag by moving at least one of the airbag and concentrator relative to the other so that the airbag passes completely through the outlet, an area between the inlet and the outlet defining an airbag compressing region, and
    an airbag package including lateral openings for receiving aligned attachment tabs on the airbag and having an inlet positioned at the outlet of the concentrator so that the airbag may be continuously pulled through the concentrator and into the airbag package.

2. An airbag packaging system according to claim 1, wherein the concentrator comprises a base plate and first and second concentrating elements mounted, spaced apart, on the base plate, the first concentrating element having a first cross section and the second concentrating element having a second cross section that is smaller than the first cross section.

3. An airbag packaging system according to claim 2, wherein the concentrator includes at least one additional intermediary concentrating element secured to the base within the compressing region, between the first and second concentrating elements, the cross section of the additional concentrating element corresponding to a tapering profile of the concentrator.

4. An airbag packaging system according to claim 2, wherein the first and second concentrating elements having openings with a same height.

5. An airbag packaging system according to claim 2, wherein the concentrating elements each are U-shaped and secured to the base plate in an inverted configuration so that the base plate covers an open end side of the U-shaped concentrating elements.

6. An airbag packaging system according to claim 2, wherein at least the first and second concentrating elements include pre-orienting elements for forming substantially uniform folds substantially along a longitudinal direction.

7. An airbag packaging system according to claim 6, wherein the base plate also includes pre-orienting elements.

8. An airbag packaging system according to claim 7, wherein the pre-orienting elements of the first and second concentrating elements are staggered relative to the pre-orienting elements of the base plate.

9. An airbag packaging system according to claim 1, wherein the concentrator comprises a base plate, a pair of concentrating elements mounted on the base plate, and a cover plate positioned over the concentrating elements so that the base and cover plates sandwich the concentrating elements.

10. An airbag packaging system according to claim 9, wherein the height of the concentrating elements defines the height between the base and cover plates.

11. An airbag packaging system according to claim 9, wherein the concentrating elements comprise a pair of opposing side walls tapering toward the outlet.

12. An airbag packaging system according to claim 9, wherein at least the cover plate includes pre-orienting elements for forming substantially uniform folds substantially along a longitudinal direction.

13. An airbag packaging system according to claim 12, wherein the base plate also includes pre-orienting elements.

14. An airbag packaging system according to claim 13, wherein the pre-orienting elements of the base plates are staggered relative to the pre-orienting elements of the cover plates.

15. An airbag packaging system according to claim 14, wherein at least one of the pre-orientating elements of the base plate and the pre-orienting elements of the cover plate is retractable out of the folding region.

16. An airbag packaging system according to claim 13, wherein the pre-orienting elements comprise vertical webs or pins connected alternately to the base plate and the cover plate.

17. An airbag packaging system according to claim 1, wherein at least the inlet and outlet include pre-orientating elements for forming substantially uniform folds substantially along a longitudinal direction.

18. An airbag packaging system according to claim 17, wherein the pre-orientating elements form concertina-shaped folds substantially along the longitudinal direction.

19. An airbag packaging system according to claim 1, wherein the package is elongate has a cross section substantially corresponding to the outlet of the concentrator and the airbag is elongate in an extended state.

20. An airbag packaging system according to claim 1, wherein the concentrator is tapered along a horizontal plane and is parallel along a vertical plane.

21. An airbag packaging system according to claim 1, wherein the concentrator further includes pre-orienting elements for forming substantially uniform folds along a substantially pulling direction of the airbag.

22. An airbag packaging system according to claim 1, wherein the airbag is a side-window airbag, wherein the length of the airbag package corresponds substantially to an extent of the airbag in the longitudinal direction.

23. An airbag packaging system according to claim 1, wherein the airbag is provided with a strap at one end portion thereof, and the strap is pulled through the concentrator and the airbag package while maintaining the concentrator at a fixed position so that the strap becomes exposed through the airbag package.

24. An airbag packaging system according to claim 1, wherein the airbag is provided with a strap at one end portion thereof, the strap is fixed to a stationary element, and the concentrator and the airbag package together are moved relative to the airbag so that the strap becomes exposed through the airbag package.

25. An airbag packaging system according to claim 1, wherein attachment tabs align with the lateral openings when the airbag is fully inserted into the airbag package, wherein the attachment tabs are pulled through the lateral openings.

* * * * *